Oct. 4, 1938.　　　　　F. R. HOUSE　　　　　2,131,952
NOCTURNAL ANTIAIRCRAFT FIRE CONTROL SYSTEM
Filed July 30, 1935　　　3 Sheets-Sheet 2
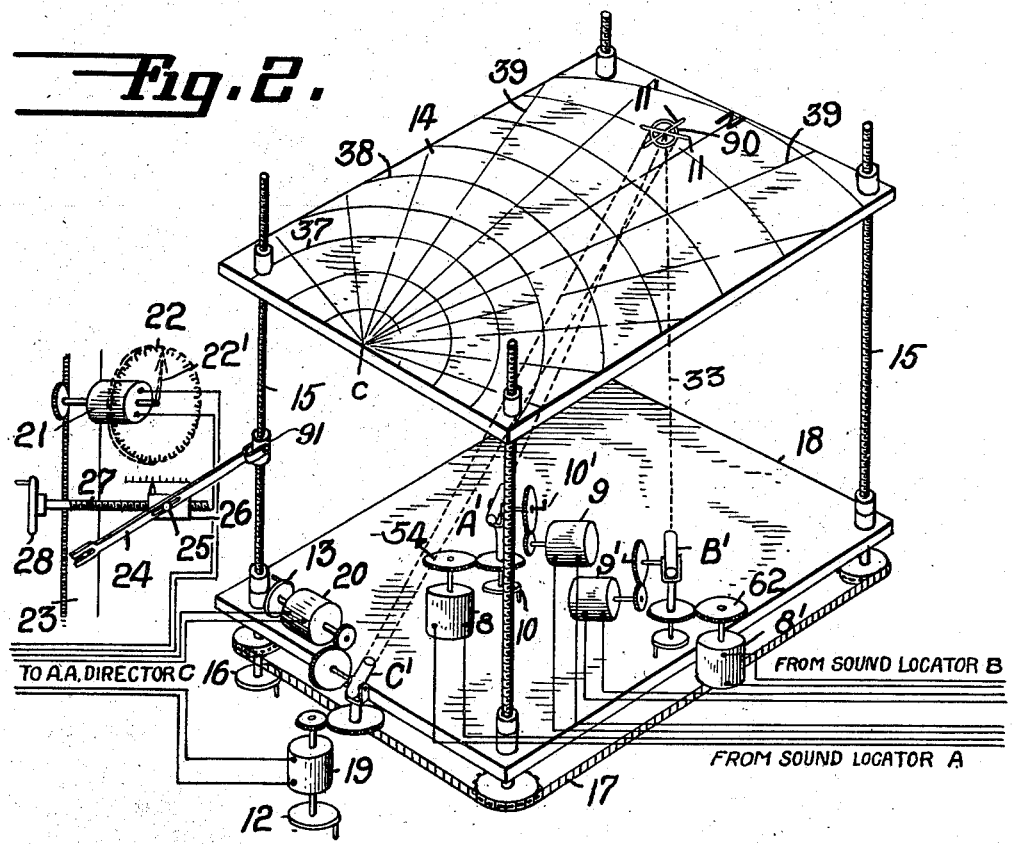
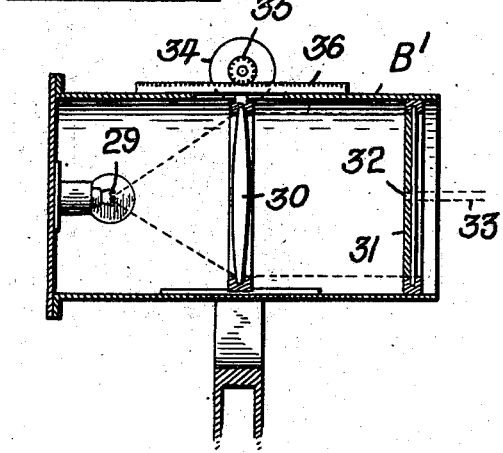
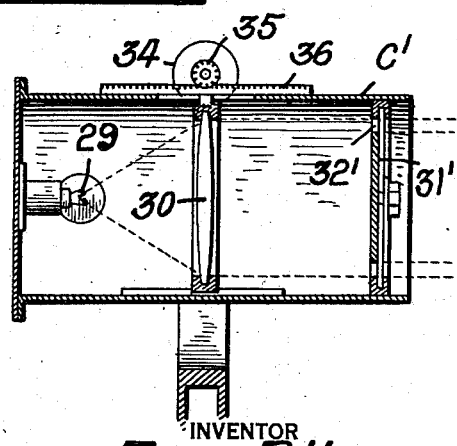
INVENTOR
FRANK R. HOUSE
BY
Herbert H. Thompson
HIS ATTORNEY.

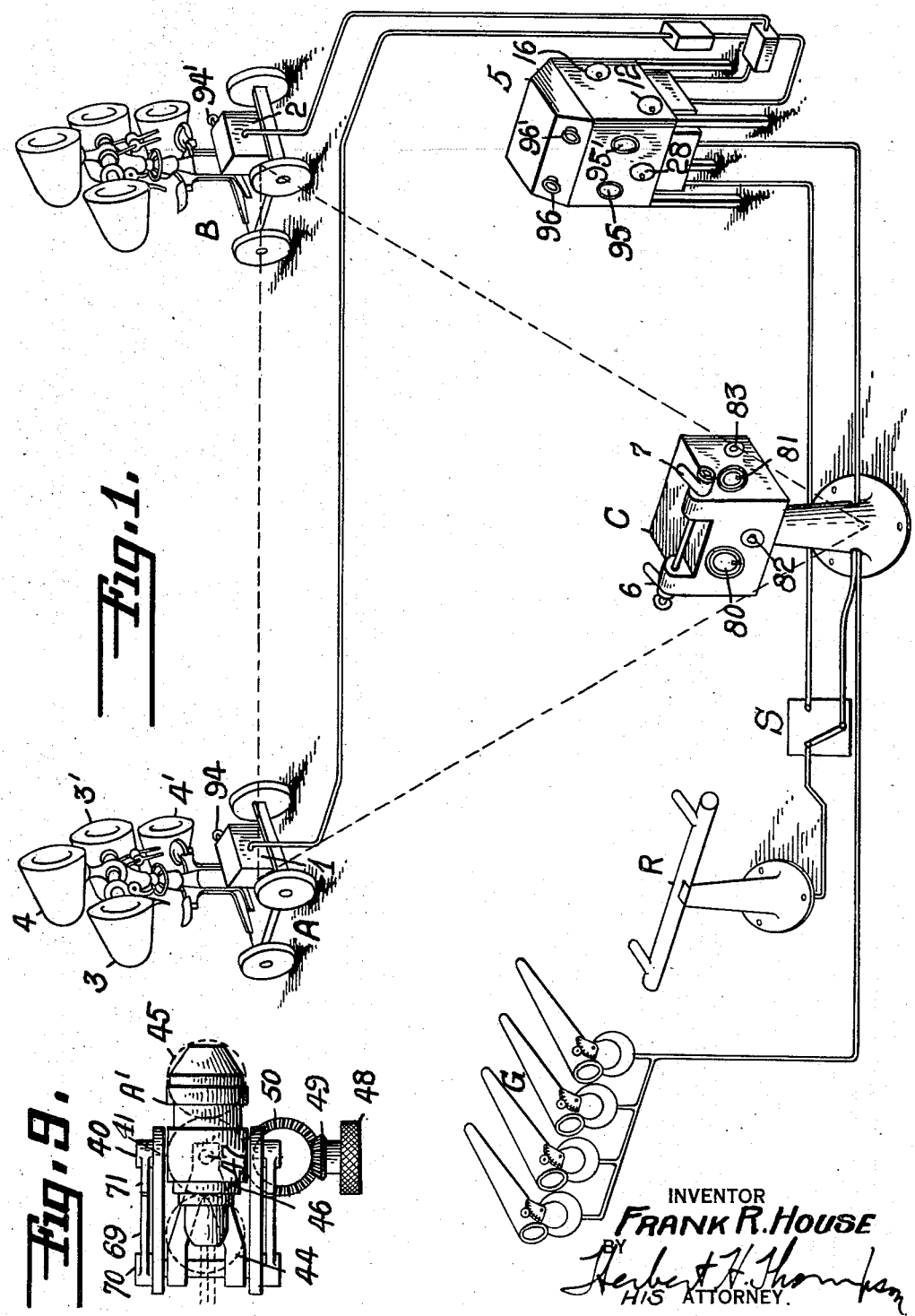

Oct. 4, 1938.   F. R. HOUSE   2,131,952
NOCTURNAL ANTIAIRCRAFT FIRE CONTROL SYSTEM
Filed July 30, 1935   3 Sheets—Sheet 3
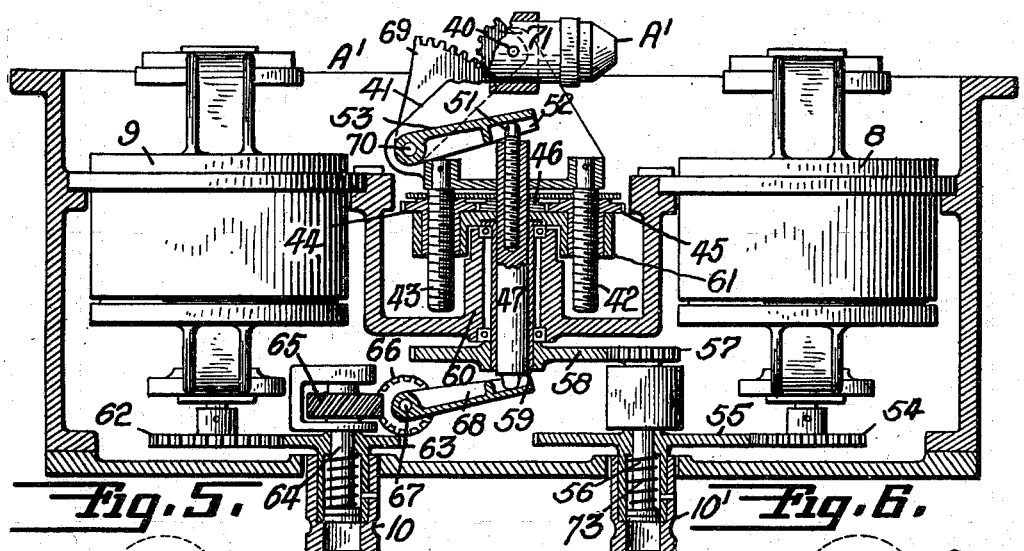
INVENTOR
FRANK R. HOUSE
BY
Herbert H. Thompson
HIS ATTORNEY.

Patented Oct. 4, 1938

2,131,952

UNITED STATES PATENT OFFICE 2,131,952

NOCTURNAL ANTIAIRCRAFT FIRE CONTROL SYSTEM

Frank R. House, Baldwin Harbor, N. Y., assignor to Sperry Gyroscope Company, Inc., Brooklyn, N. Y., a corporation of New York Application July 30, 1935, Serial No. 33,803

16 Claims. (Cl. 33—66)

This invention relates to an improved system for directing fire control under conditions of poor visibility. According to the present system for directing anti-aircraft fire at night, sound locators are used to obtain the approximate location of the hostile craft and searchlights are controlled directly or indirectly therefrom to accurately locate the aircraft. After the searchlight beam locates the craft, the anti-aircraft director sights are sighted on the craft and the regular fire control system used in the daytime is set in operation. This system has certain disadvantages, since the effectiveness of anti-aircraft equipment is in a great measure dependent upon the element of surprise. Once the searchlight beam shows itself in searching for a craft, the aviator is warned of the presence of defense batteries, so that he may then maneuver so as to prevent the anti-aircraft director from setting up future target positions.

According to my present invention, I propose to avoid the necessity for employing searchlights to locate the craft at night or in fog, and to direct the fire control from the data supplied by a plurality of spaced sound locators. The firing may then be started prior to the time the searchlights are turned on, or the searchlights dispensed with entirely. My system is also adapted for locating the craft when flying above clouds or when illumination by searchlight is otherwise prevented, as by a smoke screen.

A further object of my invention is to utilize the standard forms of both sound locators and anti-aircraft directors or predictors by converting the data supplied by the sound locators into azimuth and elevation angles and altitude, properly converted with respect to the position of the anti-aircraft director sights, so that the same director or predictor may be used both before and after the target is actually sighted and the director positioned automatically in the proper position to locate the target if and when the searchlights are flashed on. The searchlight units, however, are not illustrated herein, but it will be understood that they may be employed as a supplement to the present system, as described in my prior patent, joint with Preston R. Bassett, No. 2,003,661, dated June 4, 1935, for Searchlight directors. Or my invention may be used to direct star shells to illuminate the target so that it may be picked up by the sights and/or searchlights.

My invention also has application to anti-aircraft fire control systems in general, many features applying to optical systems as well as sound locator systems.

Referring to the drawings disclosing one form my invention may assume,

Fig. 1 is a diagram illustrating the several units of my invention.

Fig. 2 is a perspective view, in diagrammatic form, of my converter.

Fig. 3 is a sectional detal of one of the miniature beam projectors used in the converter, representing one of the sound locators.

Fig. 4 is a similar view of the beam projector representing the director sight.

Fig. 5 is a vertical section of a miniature sound locator beam projector mechanism, the lamp itself being of a slightly different form than shown in Fig. 3.

Fig. 6 is a similar section of a miniature director beam projector.

Fig. 7 is a plan view of the ground glass screen of Fig. 2, showing an improved attachment for obtaining the speed and course of the target.

Fig. 8 is an enlarged view of the indicating attachment of Fig. 7.

Fig. 9 is a detail of the sound beam projector device, showing the setting means for altitude.

According to my invention, I utilize a plurality of spaced sound locators A and B for feeding suitable data into a fire control director or predictor C. The sound locaters may be of any suitable type, such as disclosed in the aforesaid patent or in my patent application Serial No. 735,989, filed July 19, 1934, for Systems of locating aircraft at night, and it will be understood that they are equipped with suitable sound lag and other error correcting devices as shown in the aforesaid patent and application, which are entirely enclosed within boxes 1 and 2 at the base of the sound locators. The sound locator consists essentially of two pairs of sound receivers 3, 3' and 4, 4' spaced laterally and vertically, respectively, and mounted for rotation in azimuth and in elevation by suitable hand wheels by two operators, one of which compares the sound received by the receivers 3 and 3' and the other by receivers 4 and 4'. The angular movement of each sound locator in azimuth and elevation is corrected for sound lag and other errors, as stated above, in boxes 1 and 2, and is transmitted to the converting instrument 5, by means of which this data is transformed into data suitable for being supplied to the director c in place of the angular movements ordinarily supplied thereto by the operators in following the target through the sights 6 and 7.

The essential elements of the converter 5 are shown in Fig. 2. It is primarily an optical device by which the relative positions of the target and the two sound locators and the sights and director are set up in miniature and from which suitable data is obtained for actuating the director. In the base of said instrument in the instrument in the same relative position (to scale) as are the two sound locators. Similarly, a third beam projector C' is positioned in the same relative position with respect to the other two as the director is positioned with respect to the sound locators. The azimuth and elevation angles from sound locator A are transmitted to projector A' by any suitable electrical transmission system, which turns the azimuth repeater motor 8 and the elevation repeater motor 9 to turn the projecor in azimuth and elevation, respectively, through suitable gearing 54. Hand cranks 10 and 10' are shown to synchronize the device, if necessary, with the transmitters, although a self-synchronous system may be employed if desired.

Similarly, the projector B' is positioned in azimuth and elevation, respectively, by repeater motors 8' and 9' actuated from transmitters at the sound locator B. Each of said projectors casts a pencil or strip of light 11 and 11', preferably at right angles to one another, on a ground glass or other screen 14 above the projectors. Said screen is adjustable vertically, as by means of the threaded rods 15 which support the same. Vertical adjustment is secured by rotation of the hand wheel 16, all of the rods being connected to rotate together by suitable sprocket gearing 17 under the base 18. The light images of the two pencils of light 11 and 11' will bisect each other, that is, be concentric, only when the ground glass screen is positioned at a height proportional to the elevation of the target.

The projector C' projects a small circle of light 90 and is rotated in azimuth and elevation by hand wheels 12 and 13, the operator directing the luminous circle so as to lie concentric with the point of intersection of said light pencils 11 and 11'. If, then, the three projectors A', B' and C' are positioned to scale with reference to instruments A, B and C, the angle in azimuth and elevation of projector C' will be the same as the true sight angles in azimuth and elevation and may be fed directly into the director or predictor C. To this end, azimuth and elevation transmitters 19 and 20 are shown connected to the projector C' through suitable gearing.

Similarly, the height of the screen 14 above the base 18 is indicative of the altitude of the target, so that a third transmitter 21 may be used to transmit altitude, and the altitude may also be shown directly on scale 22. The transmitter 21 and the index 22' of scale 22 are shown as actuated in accordance with the vertical movements of the screen 14, from a slide 23 which is moved up and down by a pivoted link 24 pinned at its opposite end to a nut 91 threaded on shaft 15. If desired, means may be provided to change the scale of the instrument, in which case the pivot 25 of the lever 24 may be adjustable, as by being mounted on a nut 26 threaded on shaft 27, turned by hand wheel 28. If the instrument is equipped with this device, the devices A, B and C need not be set up in the field at a fixed distance apart as long as the angles of the triangle ABC remain the same as the angles of the triangle A'B'C' and the distances are known.

A convenient means for signaling the observers at converter 5 from the sound locators is provided by having the lamps 29 therein in circuit with switch buttons 94, 94' at the sound locators, the operators at the latter only closing the switch when his locator is "on" the target. Therefore the observers at 5 do not begin to operate the same until both projectors A' and B' are lit, which may show at windows 95 and 95'. Eye pieces 96 and 96' are shown, through which the observers view screen 14.

A simple form of beam projector A' or B' is shown in Fig. 3, in which the light from the lamp 29 is projected by the collector lens 30 through a front window 31 which is opaque except for a horizontal slot 32 therein, projecting the pencil of light 33. The lens is shown as adjustable to and from the light source by means of knob 34, pinion 35 and rack 36. The projector C' may be identical, except that it projects a small spot or ring of light, which may be secured by an opaque front door 31' having an annular slot 32' therein.

The ground glass screen may, if desired, be provided with concentric arcs 37, 38, etc., which may be graduated in thousands of yards to indicate horizontal range at the normal scale. If the scale is changed, the readings may be interpolated in accordance with a suitable table. The chart may also be provided with radial lines 39 radiating from the center c directly above the vertical axis of C', which angles indicate azimuth, so that the target's angular position in azimuth and horizontal range may be read directly from the chart.

It frequently happens in the field that it is impossible to locate the instruments A, B and C in the same horizontal plane, and therefore I preferably provide means for relatively adjusting the miniature representations of these instruments to correspond with the actual relative height of the instruments in the field. The instrument C' may be taken as datum and may not be vertically adjustable, but the other two projectors A' and B' are vertically adjustable.

The preferred construction of each of said instruments is shown in Fig. 5, while Fig. 6 illustrates the preferred construction of the instrument C'. In Fig. 5, the azimuth and elevation repeater motors are again shown at 8 and 9 and the screen projector itself at A'. Said projector is shown as pivotally mounted about a horizontal axis on a bracket 41. Said bracket is mounted on a pair of threaded stub shafts 42 and 43 which are pinned to the bracket so as to be fixed against rotation. Threaded on said shafts are a pair of pinions 44 which are rotated from a common pinion 46 keyed to a central shaft 47, and which pinions are journaled in a supporting member 61. The pinion 46 is manually adjusted from a turn button 48 (Fig. 9) through suitable gearing 49, 40 so that the linear elevation or relative height of the projector A' may be adjusted. The rotation of pinion 46 also rotates the shaft 47 within which is threaded a stub shaft 51, which is fixed against rotation within a slot 52 in pivoted arm 53 so that the effective length of the double shaft 47—51 is varied as the bracket 41 is raised and lowered, so that the angular position of the arm 53 remains unchanged in spite of any vertical adjustments of the projector.

The projector is shown as revolved in azimuth from the repeater motor 8 by pinion 54 on the shaft of the repeater motor, gear 55 on shaft 7

56, pinion 57 on the upper end of said shaft, and a gear 58 secured to a sleeve 59 rotatably mounted in a fixed bearing housing 60. The upper end of said sleeve is secured to said member 61, which supports the pinions 44 and 45 and bracket 41 on which the projector is mounted, so that the bracket is turned in azimuth from motor 8.

For angular adjustment in elevation, the shaft of the repeater motor 9 has a pinion 62 which meshes with a pinion 63. On the shaft 64 of the latter pinion is a spiral gear 65 which meshes with a second spiral gear 66 to revolve the shaft 67 on which an arm 68 is mounted. Said arm supports at its lower end the aforesaid shaft 47, so that the angular up and down movements thereof are reproduced by the arm 52 which rests on the upper end of the double shaft 47—51, the pivots of the two arms being in vertical alignment and the arms of the same length. The angular movements of the arm 53 are transmitted to the projector through any suitable means, such as segmental gear 69 secured to the shaft 70 of said arm, the teeth of which mesh with a segmental pinion 71 which is secured to the trunnion 40 of the projector A'.

For synchronizing purposes, I have shown setting knobs 10 and 10'. To operate the same, the operator first pulls the knob outwardly against the action of spring 73, thus throwing gear 55 out of mesh with gear 54. The operator then turns the knob to revolve the shaft 56 for proper setting and then releases the knob to re-engage the gears. The operation of knob 10' may be identical.

The construction of the projector C' may be quite similar, as shown in Fig. 6, except that no provision need be made for vertical adjustment, the shaft 47' in this instance being a simple shaft connecting the two arms 52' and 67'. The azimuth and elevation transmitters are shown at 19 and 20, respectively, the operating hand cranks at 12 and 16 being shown as connected to the shafts of the repeater motors through suitable worm gearing 72 and 72'.

Figs. 7 and 8 show how the position of the target may be determined rapidly, if desired, from the ground glass chart. In this case there is employed a slotted pointer 75 which may be pivotally mounted on the shaft 76 of a rubber button 77 adapted to be temporarily stuck on the glass above the present position of the target. At the end of a fixed time interval, say one minute, the position of the light beam is observed to be at P' and the arrow is rotated so that the outer end of the slot lies at said point. The distance traveled, and therefore the speed, of the target may then be read directly on the scale 78 on the arrow, and the past and present bearing angles read directly.

My invention is especially adapted for use in connection with a director of the type described in the copending application of Messrs. Chafee, Myers and Murtagh, now Patent #2,065,303, dated December 22, 1936. According to this system, the height of the target is usually fed in from a separate height or range finder R. When, however, the sound locator system is in use, a switch S is thrown so as to disconnect the height finder and connect the director to the converter 5 which feeds in height as well as azimuth and elevation angles.

Said angles are continuously fed into the director by repeater motors (not shown) actuated from the transmitters 19 and 20. These repeater motors may either revolve the sights themselves in azimuth or elevation so that they are directed at the target, or they may actuate azimuth and elevation pointers 80, 81 so that operators at the instrument may set the same into the device by a follow-the-pointer system through hand wheels 82, 83. Similarly, the height of the target may be set in from the transmitter 21 either through a wholly mechanical system or by a follow-the-pointer system through human agencies.

It will be understood that the firing data generated by the director as future azimuth and quadrant elevation is transmitted to the battery G through a suitable data receiver system, the director automatically incorporating the parallax correction for the difference between the position of the director and battery in both azimuth and elevation, as pointed out in the aforesaid Patent #2,065,303.

The optical indicator of Figs. 2 to 8, inclusive, is of course capable of being used with other types of target locators than sound locators. Thus, of desired, it might be used in connection with a pair of spaced sights which would position, respectively, the miniature projectors A' and B'. This system would have the advantage over ordinary sights such as 6 and 7, that altitude would be determined without a separate height finder, and also that it would indicate optically the course, speed, bearings and horizontal range of the target. In fact, it could be used in place of a complicated director in emergency or under certain circumstances, since it readily shows the target's course and speed and therefore the future position may be readily predicted. When my invention is used with spaced sights at A and B, no sights at the battery or director C need be employed, and the position of the battery G or firing base may be considered as the apex of the triangle containing the sights A and B, so that the projector C' represents the gun position and the machine of Fig. 2 will give target bearings, elevation angle, height and horizontal range directly. If a predictor is used, such as disclosed in the aforesaid application Serial No. 654,090, it may be placed at any concealed point, since it then merely becomes a computing device. It will also be obvious that my invention may be used in a variety of ways in anti-aircraft fire control. Thus, in case only one sound locator or sighting device is available, my invention can still be used to advantage in the following manner. The spot of light thrown by the beam of the miniature projector A', for instance, could be followed on the ground glass screen 14 and the arrow 75 placed as shown in Fig. 7 to lie along this path. As described above, the distance traveled by the spot along the scale 78 in unit time would represent the speed of the craft, provided the screen were positioned at the correct altitude. However, the speed of modern aircraft can be closely estimated if the type of aircraft is known. To operate in this manner, the operator estimates the target speed and therefore, if he finds that the length of the path traced on the screen in unit time, as measured by the scale 78, differs from the estimated speed, this indicates that the screen is not set for the proper altitude. In other words, the height of the screen should be varied as a function of the amount the indicated speed is wrong. As soon as the length of the path traveled indicates the correct aircraft speed, the altitude as indicated on the scale 22 will be correct, and also the target course traced on the screen will be of the correct length. From this it follows that the correct horizontal range will also be shown by the machine, as explained above. It is obvious that the device of Fig. 3 may be suitably calibrated for use in comparing the length of the path traced with the target speed, thus giving directly, if desired, the altitude correction factor.

It is also obvious that the movements of the spot intersection of the beams from A' and B' on the screen give at once the plan projection of the target's course, and that the movements of this spot may be followed by means other than the third beam projector C'.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. An optical computing instrument for nocturnal anti-aircraft fire control systems employing a pair of spaced sound locators, an anti-aircraft director and sights, comprising a pair of miniature beam projectors spaced to scale, means for turning each of said projectors about two axes from said sound locators, respectively, a screen above said projectors, means for adjusting the height thereof so that said beams are coincident on said screen, a third beam projector spaced relative to said projectors proportionally to the position of the director sights with respect to said sound locators, means for adjusting said last named projector about two axes, and means for feeding the angular movements of the same into said director as the projections from said three projectors are maintained coincident on said screen.

2. A nocturnal anti-aircraft fire control instrument as claimed in claim 1, in which the height adjustment of said screen also feeds into said director as altitude.

3. A nocturnal anti-aircraft fire control instrument as claimed in claim 1, having means for adjusting the relative vertical distance of said projectors from the plane of said screen in accordance with the relative altitude of the two sound locators and director sights.

4. In an anti-aircraft fire control system, a device for reproducing to scale the relative position of the target, target locators and firing base, comprising a pair of beam projectors positioned in azimuth and elevation respectively from a pair of spaced target locators, a third beam projector spaced relative to said projectors proportionally to the position of the base relative to the locators, means for positioning the same in azimuth and elevation, and a vertically adjustable screen on which the three beams may be made coincident, whereby the angular position of the third projector shows the bearings and angular elevation of the target and the height of the screen shows the height of the target.

5. An optical target's course reproducing device as claimed in claim 4, having a scale adapted to be pivoted on said screen above the target's present position to indicate the course and speed of the target at the expiration of unit time.

6. In an anti-aircraft fire control system, a device for reproducing to scale the relative position of the target, target locators and firing base, comprising a pair of beam projectors positioned in azimuth and elevation respectively from a pair of spaced target locators, a third beam projector spaced relative to said projectors proportionally to the position of the base relative to said locators, means for positioning the same in azimuth and elevation, a screen, means for adjusting said screen so that the beams from said first two projectors intersect thereon to produce a common image, means for adjusting said third projector so that the image of its beam is coincident with said common image, and means for transmitting the bearings and angular elevation of said target to said base from the angular position of said last named projector.

7. In an anti-aircraft fire control system employing a pair of spaced target locators, an anti-aircraft director or predictor and battery, a target locating device for use in conjunction therewith comprising a pair of miniature beam projectors spaced to scale, means for turning each of said projectors about two axes from said locators respectively, a screen above said projectors, means for adjusting the height thereof so that said beams are coincident on said screen, an angularly adjustable optical device spaced relative to said other projectors proportionally to the position of said battery, means for adjusting the same about two axes, and means for feeding the angular movements of the same into said predictor as the axis of said device is maintained in line with the coincident image of the beams of said beam projectors on the screen.

8. An anti-aircraft fire control device as claimed in claim 7, having a transmitter rotated by the height adjustment of said screen said transmitter feeding altitude into said predictor.

9. An anti-aircraft fire control device as claimed in claim 7, having means for adjusting the relative vertical distance of said projectors from the plane of said screen in accordance with the relative altitude of the two locators and battery.

10. In an anti-aircraft fire control system employing a pair of spaced target locators and an anti-aircraft battery, a pair of miniature beam projectors spaced to scale, means for turning each of said projectors about two axes from said locators respectively, a screen above said projectors, means for adjusting the height thereof so that said beams are coincident on said screen, a third beam projector spaced relative to said other projectors proportionally to the position of said battery, means for adjusting the same about two axes, whereby the angular position of the third projector indicates the bearings and angular elevation of the target, the height of the screen the height of the target, and the position of the spot on the screen the horizontal range of the target.

11. In an anti-aircraft fire control system, a device for reproducing to scale the relative position of the target, target locators and firing base, comprising a pair of beam projectors positioned in azimuth and elevation respectively from a pair of spaced target locators, a third beam projector spaced relative to said projectors proportionally to the position of the base relative to said locators, means for positioning the same in azimuth and elevation, a screen, means for adjusting said screen so that all three beams intersect thereon, means for transmitting the bearings and angular elevation of said target to said base from the angular position of said last named projector, and adjustable means for transmitting the height of said screen to said base, whereby the scale of the device may be altered.

12. In an anti-aircraft fire control system, a miniature beam projector rotatably mounted in azimuth and elevation planes, means for positioning the same in both said planes from a target observing device such as a sound locator or sight, a screen above said projector, a settable scale adapted to be positioned on said screen along the path of the moving spot to show the target's course and speed, and means for adjusting the height of said screen so that the indicated speed equals the estimated speed, whereby the target's height and range are indicated.

13. In an anti-aircraft fire control system employing an anti-aircraft director or predictor, a battery, and a pair of spaced target locators, a pair of miniature beam projectors spaced to scale, means for turning each of said projectors about two axes from said locators respectively, a screen above said projectors, means for adjusting the height thereof so that said beams are coincident on said screen, and angularly adjustable optical means for following the intersection of said beams on said screen, whereby the required angular position in azimuth and elevation of the target's position and movements are obtained by the angular position of said optical means relative to predetermined coordinate axes.

14. An anti-aircraft fire control system as claimed in claim 13, having means for adjusting the relative vertical distance of said projectors from the plane of said screen in accordance with the relative altitude of the two locators and battery, whereby the altitude of the target is obtained.

15. An optical computing instrument for anti-aircraft fire control systems employing an anti-aircraft director, and two distant control instruments, comprising a pair of miniature beam projectors spaced to scale, means for turning each of said projectors about two axes from said control instruments, respectively, a screen above said projectors, means for adjusting the height thereof so that said beams are coincident on said screen, a third beam projector spaced relative to said projectors proportionally to the position of the director and battery placement, means for adjusting said last named projector about two axes, and means for feeding the angular movements of the same into said director as the projections from said three projectors are maintained coincident on said screen.

16. An anti-aircraft fire control instrument as claimed in claim 15, having means for adjusting the relative vertical distance of said projectors from the plane of said screen in accordance with relative altitude above the two control instruments and the director.

FRANK R. HOUSE.